(12) United States Patent
Zell et al.

(10) Patent No.: US 11,468,156 B2
(45) Date of Patent: Oct. 11, 2022

(54) ACCESS CONTROL SYSTEM FOR CONTROLLING ACCESS OF A USER TO ONE OR MORE OPERATING FUNCTIONS OF A TECHNICAL INSTALLATION

(71) Applicant: PILZ GMBH & CO. KG, Ostfildern (DE)

(72) Inventors: Christoph Zell, Ostfildern (DE); Juergen Fleiner, Ostfildern (DE); Raphael Schuchardt, Ostfildern (DE); Peter Schuster, Ostfildern (DE); Waldemar Friesen, Ostfildern (DE)

(73) Assignee: Pilz GmbH & Co. KG, Ostfildern (DE)

(*) Notice: Subject to any disclaimer, the term of this patent is extended or adjusted under 35 U.S.C. 154(b) by 193 days.

(21) Appl. No.: 16/833,434

(22) Filed: Mar. 27, 2020

(65) Prior Publication Data

US 2020/0320186 A1    Oct. 8, 2020

(30) Foreign Application Priority Data

Mar. 28, 2019   (DE) .................. 10 2019 108 049.5

(51) Int. Cl.
*G06F 21/35* (2013.01)
*G05B 19/05* (2006.01)

(52) U.S. Cl.
CPC .......... *G06F 21/35* (2013.01); *G05B 19/058* (2013.01); *G05B 2219/15037* (2013.01); *G06F 2221/2137* (2013.01); *G06F 2221/2139* (2013.01)

(58) Field of Classification Search
CPC ............. G06F 21/35; G06F 2221/2137; G06F 2221/2139; G06F 21/604; G06F 21/6218;
(Continued)

(56) References Cited

U.S. PATENT DOCUMENTS 8,344,848 B2   1/2013  Moschl et al.
8,701,199 B1*  4/2014  Dotan .................... H04L 63/18
                                                      726/25
(Continued)

FOREIGN PATENT DOCUMENTS

DE        100 37 003.9 A1    2/2002
DE   10 2007 041 768.5 A1    3/2009
(Continued)

OTHER PUBLICATIONS

Herzberg et al.: On Travelling Incognito; First Workshop on Mobile Computing Systems and Applications, WMCSA 1994, pp. 205-211.

*Primary Examiner* — David Garcia Cervetti
(74) *Attorney, Agent, or Firm* — Miller Johnson (57) ABSTRACT

An access control system controls access of a user to one or more operating functions of a technical installation. The access control system includes a receiving device configured to read access authorization data from a mobile data medium and an access control device configured to receive and validate the access authorization data from the receiving device. The receiving device continuously adds a dynamic portion to the access authorization data to create dynamic access authorization data and sends the dynamic access authorization data to the access control device. The access control device, in response to the dynamic access authorization data corresponding to a defined expectation, generates a release signal for those operating functions for which the access authorization data is valid.

18 Claims, 4 Drawing Sheets

(58) Field of Classification Search
CPC ............ G06F 2221/2151; G06F 21/45; G05B 19/058; G05B 2219/15037; G05B 2219/34456; G05B 19/409; G05B 2219/36542; H04W 12/08; H04W 4/80; H04W 12/04; H04W 12/06; G06K 7/10009; H04L 63/08

See application file for complete search history.

(56) References Cited

U.S. PATENT DOCUMENTS

| | | | | |
|---|---|---|---|---|
| 8,819,803 | B1* | 8/2014 | Richards | H04L 63/1483 709/224 |
| 8,922,342 | B1* | 12/2014 | Ashenfelter | G07C 9/257 382/129 |
| 9,033,218 | B1* | 5/2015 | Batra | G06K 19/077 235/375 |
| 9,178,880 | B1* | 11/2015 | Dotan | H04W 12/068 |
| 9,801,066 | B1* | 10/2017 | Hanley | G06Q 20/405 |
| 9,887,980 | B1* | 2/2018 | Balmakhtar | H04W 12/069 |
| 9,923,927 | B1* | 3/2018 | McClintock | H04L 63/0846 |
| 9,959,398 | B1* | 5/2018 | Blair | H04L 63/08 |
| 10,007,779 | B1* | 6/2018 | McClintock | G06F 21/31 |
| 10,803,436 | B2* | 10/2020 | Kobres | G06Q 20/40145 |
| 10,849,191 | B2* | 11/2020 | Wang | H04W 88/06 |
| 11,222,106 | B1* | 1/2022 | Duke | G06F 21/34 |
| 2002/0158597 | A1* | 10/2002 | Endo | G05B 19/21 318/560 |
| 2004/0105427 | A1* | 6/2004 | Friedrich | H04L 67/02 370/352 |
| 2005/0108546 | A1* | 5/2005 | Lehew | H04L 63/06 713/182 |
| 2007/0241710 | A1* | 10/2007 | Shibui | G05B 19/416 318/552 |
| 2009/0079537 | A1* | 3/2009 | Seitz | G05B 19/409 340/5.2 |
| 2009/0271633 | A1* | 10/2009 | Cohen | G06F 21/62 726/20 |
| 2010/0146592 | A1* | 6/2010 | Gamare | G06F 11/2038 726/4 |
| 2011/0252464 | A1* | 10/2011 | Sanjeev | H04W 12/30 715/780 |
| 2013/0074162 | A1* | 3/2013 | Falk | H04L 63/18 726/4 |
| 2013/0148850 | A1* | 6/2013 | Matsuda | G06V 10/758 382/103 |
| 2014/0148997 | A1* | 5/2014 | Aaron | G07B 15/00 701/99 |
| 2014/0149746 | A1* | 5/2014 | Yau | H04L 9/3226 713/185 |
| 2014/0150072 | A1* | 5/2014 | Castro | G06F 21/31 726/5 |
| 2014/0181955 | A1* | 6/2014 | Rosati | G06F 21/35 726/18 |
| 2014/0282965 | A1* | 9/2014 | Sambamurthy | G06F 21/32 726/7 |
| 2014/0283016 | A1* | 9/2014 | Sambamurthy | H04W 12/069 726/19 |
| 2014/0283059 | A1* | 9/2014 | Sambamurthy | G06F 21/552 726/23 |
| 2015/0110364 | A1* | 4/2015 | Niinuma | G06V 40/70 382/116 |
| 2015/0121464 | A1* | 4/2015 | Hughes, Jr | G06F 21/31 726/4 |
| 2015/0222619 | A1* | 8/2015 | Hughes | H04L 9/3226 713/168 |
| 2015/0227728 | A1* | 8/2015 | Grigg | H04W 4/029 726/4 |
| 2016/0005032 | A1* | 1/2016 | Yau | G06Q 20/3674 705/69 |
| 2016/0127351 | A1* | 5/2016 | Smith | G06F 21/31 726/10 |
| 2016/0224009 | A1* | 8/2016 | Seitz | G05B 19/402 |
| 2016/0231724 | A1* | 8/2016 | Bauer | G05B 19/0428 |
| 2016/0239649 | A1* | 8/2016 | Zhao | H04W 12/065 |
| 2016/0337328 | A1* | 11/2016 | Sallam | H04L 63/08 |
| 2016/0379101 | A1* | 12/2016 | Hammad | G06K 19/07354 235/380 |
| 2017/0046507 | A1* | 2/2017 | Archer | G06F 21/32 |
| 2017/0148009 | A1* | 5/2017 | Perez Lafuente | H04L 63/20 |
| 2017/0149962 | A1* | 5/2017 | Hodge | H04M 3/38 |
| 2017/0230357 | A1* | 8/2017 | Canfield | G06F 21/45 |
| 2017/0244730 | A1* | 8/2017 | Sancheti | H04L 63/20 |
| 2017/0329957 | A1* | 11/2017 | Vepa | G06F 21/445 |
| 2017/0374074 | A1* | 12/2017 | Stuntebeck | H04L 63/08 |
| 2018/0068290 | A1* | 3/2018 | Xia | G06Q 30/06 |
| 2018/0103341 | A1* | 4/2018 | Moiyallah, Jr | G06F 3/04842 |
| 2018/0124046 | A1* | 5/2018 | Verma | G06F 16/5838 |
| 2018/0159937 | A1* | 6/2018 | Stolzer | H04L 67/025 |
| 2018/0186333 | A1* | 7/2018 | Santiano | H04W 12/08 |
| 2018/0302416 | A1* | 10/2018 | Einberg | H04L 63/083 |
| 2018/0332035 | A1* | 11/2018 | Finn | G06V 40/16 |
| 2019/0010750 | A1* | 1/2019 | Scanu | E05B 51/00 |
| 2019/0065724 | A1* | 2/2019 | Dudley | H04L 9/3271 |
| 2019/0068735 | A1* | 2/2019 | Alcorn | H04L 63/0838 |
| 2019/0188720 | A1* | 6/2019 | Williams | G06Q 20/4016 |
| 2019/0294800 | A1* | 9/2019 | Andrews | G06F 21/602 |
| 2019/0342298 | A1* | 11/2019 | Chen | H04W 12/66 |
| 2019/0364027 | A1* | 11/2019 | Pande | H04L 63/08 |
| 2019/0394187 | A1* | 12/2019 | Fletcher | H04L 9/3213 |
| 2020/0065459 | A1* | 2/2020 | Himabindu | G06F 21/316 |
| 2020/0084204 | A1* | 3/2020 | Craswell | H04L 63/0838 |
| 2020/0134142 | A1* | 4/2020 | Kim | H04L 9/0643 |
| 2020/0162451 | A1* | 5/2020 | Alhawaj | G06F 21/45 |
| 2020/0257777 | A1* | 8/2020 | Rajagopalan | G06F 21/57 |
| 2020/0320186 | A1* | 10/2020 | Zell | G06F 21/6218 |
| 2020/0382957 | A1* | 12/2020 | Johnson | H04W 12/041 |
| 2021/0042043 | A1* | 2/2021 | Tomaz | G06F 21/62 |
| 2021/0044976 | A1* | 2/2021 | Avetisov | H04L 9/321 |

FOREIGN PATENT DOCUMENTS

| | | |
|---|---|---|
| DE | 102016120306 A1 | 4/2018 |
| DE | 102017103741 A1 | 8/2018 |
| EP | 1866712 B1 | 12/2007 |
| EP | 2034378 A2 | 3/2009 |

* cited by examiner

ACCESS CONTROL SYSTEM FOR CONTROLLING ACCESS OF A USER TO ONE OR MORE OPERATING FUNCTIONS OF A TECHNICAL INSTALLATION

CROSS-REFERENCE TO RELATED APPLICATIONS

This application claims priority to German Application No. 10 2019 108 049.5 filed Mar. 28, 2019. The entire disclosure of the application referenced above is incorporated by reference.

FIELD

The present disclosure relates to an access control device and access control method and more particularly to an access control system for controlling access of a user to one or more operating functions of a technical installation.

BACKGROUND

From the prior art, access control for safe operating mode selection at a technical installation, such as a machine tool, by means of one or more key switches are known. These key switches can be used to activate individual operating modes of a machine in a fail-safe manner in accordance with European safety regulations and standards.

DE 10 2007 041 768 A1 discloses, for example, a machine tool in which the data relating to access control is provided by a mobile data medium. The machine tool has a reader to read the data from the mobile data medium via a wireless interface, for example based on RFID technology. Compared to simple key switches, more extensive data can be made available for access control this way, so that more complex access controls, for example with a plurality of different authorization levels, can be implemented. Thereby, it is possible to specify exactly which user may perform which operating function on which machine tool. The use of wireless technology for access control facilitates usability and simplifies key management. Likewise, a wireless solution is less susceptible to mechanical interference or dirt, as can occur in an industrial environment.

Irrespective of the type of access control, it must be ensured, both in the case of a key-operated switch and a wireless solution, that an authorization once transmitted is current and valid—that is, it must be determined whether a key is still properly "inserted." While this is easy to achieve with a key switch via a mechanical device, special measures must be taken for wireless solutions.

One possibility is to carry out an antenna test in which the antenna of the reader is switched off for a short time and at the same time an attempt is made to read the key or the mobile data medium. If the attempt fails, proper operation is assumed. However, the problem here is that an additional hardware effort is required to be able to switch off the antenna. Likewise, increased effort is to be expected when implementing a safety application, since the antenna test must be integrated into the safety application and must not influence the safety application itself.

Another possibility is to provide the reading device for reading the mobile data medium as a safety device. Safety related equipment integrated into the reader can check in a fail-safe manner if a key or a mobile data medium is present. For example, redundant, mutually checking processing units could be added to a reader to perform tests to verify in a fail-safe manner if a key or a mobile data medium is present. Alternatively, such processing units may check by other means whether the currentness and validity of the read access authorization data can be guaranteed. Corresponding measures to turn a reading device into a safe device are known from safety technology and are defined in corresponding standards. However, implementing the reading device as a fully-fledged safety device within the meaning of these standards comes with considerable costs, as special hardware equipment is required and a corresponding effort must be made to have the reading device certified by an independent authority. In addition, there are further requirements for the integration of the safety device into the rest of the safety technology, for example, the need for two-channel data transmission.

SUMMARY

It is an object to provide an improved access control for a technical installation which has the advantages of using mobile and contactless data media as keys, but which can be implemented in a fail-safe and cost-effective manner. Furthermore, it is an object to meet the requirements of higher safety categories of relevant safety standards in an easy and effective manner.

According to a first aspect of the present disclosure, there is provided an access control system for controlling access of a user to one or more operating functions of a technical installation. The access control system comprises a receiving device for reading out access authorization data from a mobile data medium, and an access control device which is arranged to receive and validate the access authorization data from the receiving device, wherein the receiving device is further configured to continuously add a dynamic portion to the access authorization data and to send the dynamic access authorization data to the access control device, and wherein the access control device is configured to generate a release signal for those operating functions for which the access authorization data is valid if the dynamic access authorization data corresponds to a defined expectation.

According to a second aspect of the present disclosure, there is provided an access control device for controlling access of a user to one or more operating functions of a technical installation. The access control device comprises an interface for receiving access authorization data of a receiving device which reads the access authorization data from a mobile data medium and continuously supplements the access authorization data by a dynamic portion, and a processing unit configured to validate the access authorization data, wherein the access control device is further configured to generate a release signal for those operating functions for which the access authorization data is valid, if the dynamic access authorization data corresponds to a defined expectation.

According to a third aspect of the present disclosure, there is provided an access control method for controlling access of a user to one or more operating functions of a technical installation. The method comprises: receiving access authorization data from a receiving device which reads the access authorization data from a mobile data medium and continuously adds a dynamic portion to the access authorization data; validating the access authorization data by a processing unit; and generating a release signal for those operating functions for which the access authorization data is valid, if the dynamic access authorization data corresponds to a defined expectation.

It is thus an idea of the present invention to "enrich" the access authorization data read from a mobile data medium with a dynamic portion. A dynamic portion means that a portion of the access authorization data changes continuously over time. For example, the dynamic portion can be the value of a continuously incrementing or decrementing counter. The dynamic portion is transferred along with the access authorization data to the access control device, which evaluates the access authorization data and enables a user to perform those operating functions that he is allowed to perform according to the access authorization data. Activation is subject to the condition that the dynamic access authorization data correspond to a certain expectation.

The access control device can therefore compare the dynamic portion with an expectation and thus check the currentness of the access authorization data. The access control device generates a release signal for access to the operating function only if the dynamic portion corresponds to the defined expectations. If the expectation is not met, the data is discarded. This allows an error response time to be implemented, monitored and maintained.

Thus, the access control device generates a release, usually in the form of a release signal, depending on the dynamic access authorization data, i.e. on the basis of the validated access authorization data and the continuously changing information transmitted along with the access authorization data. The "enrichment" of the access authorization data with this information in order to obtain the dynamic access authorization data can be performed by the receiving equipment without additional hardware effort. The receiving device can rather be a simple and non-fail-safe device, wherein a probabilistic approach is taken to achieve an appropriate safety level by means of the dynamic portion.

In this context, "non-fail-safe" means that the receiving device does not in itself has to meet the requirements of the relevant safety standards with regard to intrinsic safety, i.e. the receiving device does not need to have any supplementary safe equipment in the meaning of safety technology. This has the advantage that inexpensive receiving devices can be used or existing non-fail-safe reading devices of a technical system can be reused. A simple software modification may be sufficient to make the access authorization data dynamic in the meaning of the present disclosure.

A further advantage is that the safety technology and general control technology can be clearly separated from each other. This enables a plant or machine manufacturer to implement access control by a user essentially independently of the safety technology required for the machine. The plant or machine manufacturer can thus purchase and retrofit safety technology independently and flexibly, which increases his freedom of design.

Furthermore, by adding the dynamic portion already at the beginning of the access control process, the entire process chain can be checked based hereupon. The proposed access control can thus efficiently cover the entire process chain.

Overall, the access control system according to this disclosure allows a cost-effective and flexible control of a user's access to one or more operating functions of a technical installation. The object mentioned at the beginning is thus completely solved.

In a further refinement, the receiving design can be configured to add a defined pattern as the dynamic portion of the access authorization data each time the access authorization data is read from the mobile data medium.

The dynamic portion can thus be linked to the readout of the access authorization data, so that different data is created at each readout, even if the access authorization data has not changed. In this way, dynamic modification can be implemented efficiently. By generating the pattern at the beginning of the access control processing chain, the complete processing chain can be tested by the pattern and its evaluation.

The pattern may include an authorization, a serial number, a counter, a current session key, one or more previous session keys, a key ID, an absolute time value and/or a relative time value, and in particular a defined combination of one or more of these elements.

The pattern can thus be formed in different ways, wherein at least one continuously changing data value is contained in the pattern. For example, the dynamic portion may include a value that corresponds to the time at which the access authorization data was read by the receiving device. Such a time stamp can be the actual time or a counter value relative to a defined start time. A time stamp as a dynamic portion has the advantage that it can be implemented easily and efficiently, which further simplifies the implementation of dynamization and can also be retrofitted to simple readers. In addition to a time stamp, other continuously changing values can also be used, which are always available at the receiving device. By combining different values to a complex pattern, a desired level of confidence can be achieved by means of a probabilistic assessment.

In a further refinement, the receiving device may be configured to generate the dynamic portion only if the access authorization data has been read out completely and/or defined as being valid.

In other words, the dynamic portion is attached to the access authorization data and is linked to its existence and validity. If no access authorization data can be read out, the dynamic portion is not added either, whereupon the access control does not generate a release, even if the access authorization data still available is valid.

In a further refinement, the receiving device can send the dynamic access authorization data to the access control device on a single channel. By using a probabilistic approach for access control based on the dynamic portion, the transmission path does not have to be additionally secured and can therefore be a single channel transmission path. This has the advantage that a simple wiring between the receiver and the access control device is sufficient, thus saving further costs. No safety protocols (PROFIsafe, FSoE, CIP Safety, etc.) have to be used, thus, eliminating the need for computationally complex coding/decoding.

In a further refinement, the receiving equipment may include a reading device for reading the mobile data medium via a wireless interface.

The mobile data medium is thus a contactless data carrier. Furthermore, communication between the receiving device and the mobile data medium is based on, for example, RFID technology. For the mobile data medium, a passive transponder can then be used, which can be read out wirelessly without its own power supply.

In a further refinement, the access control system may further comprises a selector for selection by the user of one or more operating functions, wherein the access control system is further configured to control the selector to grant the user access only to the authorized operating functions.

The access control device can thus act directly on selector, e.g. a control panel, and restrict access to only the authorized functions.

In a further refinement, the access control device can be configured to lock the selector if the dynamic portion does not change for a defined period.

The control of the selector can therefore directly depend on the dynamic portion and its evaluation. The access control device may additionally comprise safety equipment that can ensure that a selector is controlled in a fail-safe manner. This has the advantage that a safety function based on access control can be implemented directly by the access control device.

In a further refinement, the access control system can also have a fail-safe control unit which is configured to ensure fail-safe operation of the technical installation and to execute a safety function, wherein the access control device is configured to transmit the release signal to the fail-safe control unit so that the fail-safe control unit controls the technical installation based on the release signal, The fail-safe control unit may transfer the technical system to a safe state if no release signal is sent.

The normal control of the technical installation can thus be carried out as usual by a safe control system which, by taking the release signal into account, blocks access to the machine or to operating modes of the machine. As the ultima-ratio, the fail-safe control unit can also transfer the machine into a safe state if the authorization is no longer available.

In a further refinement, the access control device may be an integral part, a component and/or a module of the fail-safe control unit. The module may be a software module.

The access control device can thus be a stand-alone unit or be integrated into a fail-safe control unit. The latter has the advantage of low-cost implementation, as safety equipment in the fail-safe control unit can be shared with the access control device. In addition, safe communication between the access control device and the fail-safe control unit can be ensured in this way.

It is understood that the features mentioned above and those to be explained below can be used not only in the combination indicated in each case, but also in other combinations or in a stand-alone situation, without leaving the scope of the present invention.

BRIEF DESCRIPTION OF THE DRAWINGS

Embodiments of the invention are shown in the drawings and are explained in more detail in the following description.

DETAILED DESCRIPTION

Figure 1:
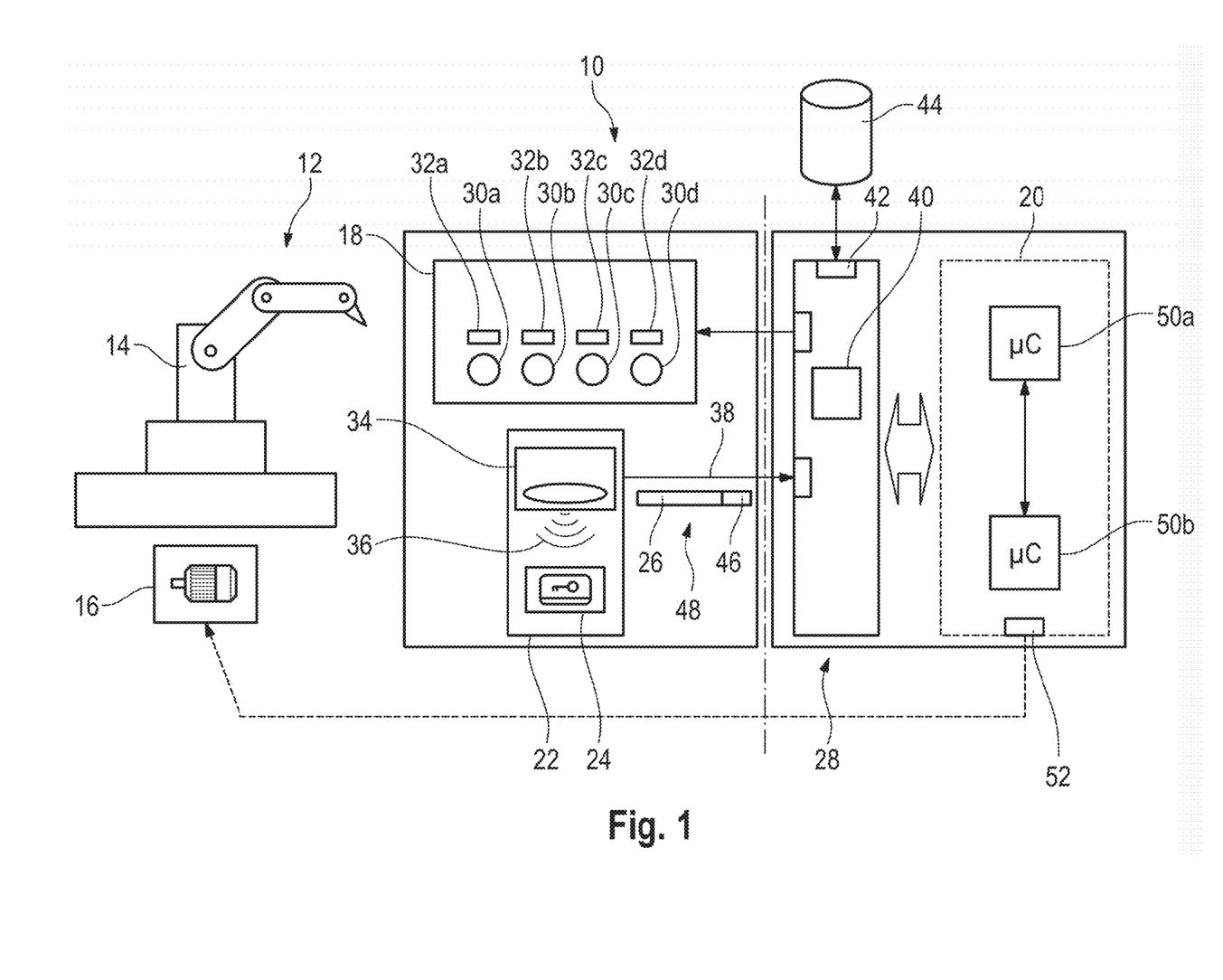
FIG. 1 is a simplified schematic representation of an example embodiment of an access control system.

FIG. 1 shows in a simplified schematic representation an example embodiment of an access control system 10 for controlling a user's access to one or more operating functions of a technical installation 12.

In this example, a robot 14 with its drives 16 is shown as technical installation 12. However, it is understood that the access control system 10 is not limited to such a design, but any other technical installation can be used with the access control system 10.

In this example embodiment, the access control system 10 comprises a selector 18 for selection of one or more operating functions by a user, a fail-safe control unit 20 (FS control), which can guarantee fail-safe operation of the technical installation, a receiving device 22, which is configured to read out access authorization data 26 from a mobile data medium 24, and an access control device 28.

The access control device 28 receives the access authorization data 26 from the receiving device 22 and validates it, i.e. the access control device 28 determines on the basis of the access authorization data 26 for which operating functions the owner of the mobile data medium is authorized. This authorization can be determined directly from the access authorization data 26 or the authorization can be derived from the access authorization data 26 by the access control device 28.

The selector 18 can, for example, be a control panel, which is arranged on the technical installation 12. The control panel can include buttons 30a-30d and associated display elements 32a-32d. With the buttons 30a-30d a user of the technical installation can select one or more operating functions. Each button may be assigned exactly one operating function of the technical appendix 12. The display elements 32a-32d can show the selected operating function after selection.

The receiving device 22 is configured to read data from a mobile data medium 24 as access authorization data 26. The data may be read out via a reading device 34, which has a wireless interface 36. The communication between the reader 34 and the mobile data medium 24 can be realized via RFID technology, for example. In this case, the mobile data medium 24 can be a passive transponder, for example a simple token, which does not require its own energy supply and communicates solely by the excitation of the reader. The reader 34 can be a standard RFID reader and can include, among other things, an authorization logic.

The access authorization data 26 is transmitted from the receiving device 22 to the access control device 28. The transmission can be a wired transmission. The wired transmission may be a simple, single-channel data transmission link 38. The transmission can be implemented without redundancy or special protocols. Instead, the transmission can be secured by means of suitable signal processing based on the dynamic access authorization data.

A coding of the authorizations itself can be chosen arbitrarily. A binary representation of the authorization may be chosen in such a way that a Hamming distance between the individual representations is as large as possible in order to ensure a high degree of robustness in the transmission and storage of the authorization. For example, the authorization can be stored in a 32-bit value and a Hamming distance of nine can be specified. Thereby, no other valid authorization can be created when changing up to 8 bits.

Based on the access authorization data 26, the access control device 28 can control the selector 18 in an example embodiment, so that only those operating functions can be selected by a user for which he has an authorization according to the access authorization data 26. For example, the access control device can activate or deactivate 28 individual buttons on the control panel, so that the respective buttons only react if the user has the appropriate authorization for the respective operating function assigned to the button in accordance with the access authorization data 26.

The display elements 32a-32d can indicate in an embodiment, in addition to the operating function that is momentarily selected, the operating functions that can be selected by the user based on the authorization of the user. For example, the display elements 32a-32d can only light up for those buttons 30a-30d whose associated operating function is permitted according to access authorization data 26.

The access control device 28 may also include a determination unit. Based on the access authorization data 26 received by the receiving device 22, the locking device 40 determines which operating functions may be performed by a user. On the basis of this determination, the access control device 28 controls access to the technical installation in the manner described above by granting the user access only for those selected operating functions that the user is authorized to perform.

To determine the authorization, the determination unit 40 can access a server via a communication interface 42, for example via a local data network 44. The server can provide the authorizations of the identified user to the access control device 28 based on a user identification. Alternatively or additionally, the authorizations can also be stored on the access control device 28 itself.

According to the invention, the receiving device 22 is also configured to add a dynamic portion 46 to the access authorization data 26 and to send the dynamic access authorization data 48 to the access control device 28.

The receiving device 22 can make the access authorization data 26 dynamic depending on the readout process, i.e., directly at the beginning of the access control process chain. For example, the receiving device 22 enriches the access authorization data 26 with the dynamic portion 46 during each readout process. It is also conceivable that dynamization is linked to the presence of the mobile data medium in an effective range of the receiving device 22. In other words, the receiving device 22 can be configured to make the access authorization data 26 dynamic only if the mobile data medium 24 is "plugged in" and can act without contact, i.e. the access authorization data 26 can be acquired by the receiving device 22.

The dynamic portion 46 can be a part of the access authorization data 26 that changes over time. The dynamic access authorization data 48 for a particular authorization at an initial time is therefore different from the dynamic access authorization data 48 for the same authorization at another time. When continuously reading the access authorization data 26 from the mobile data medium 24, the receiving device 22 can, for example, append a time stamp to the read access authorization data 26 or combine it with a time stamp to generate the dynamic access authorization data 48.

The dynamic portion can be a defined pattern that is linked to the access authorization data read from the mobile data medium. For example, the pattern may include a permission, a serial number, a counter, a current session key, one or more previous session keys, an absolute time value and/or a relative time value. In the case of NFC, the session keys can be, for example, a current NFC session key and/or one or more NFC session keys from a previous cycle. The pattern can be a defined combination of several of the above elements. The more complex the pattern is, the higher an achievable confidence level based on a probabilistic assessment can be.

The dynamic access authorization data 48 is transmitted to the access control device 28 and the access authorization data 26 contained therein is used for access control in the manner described above. The dynamic portion 46 is used to check that the access authorization data 48 is up-to-date and can be used to implement a safety function. The dynamic portion can ensure that access to the technical installation or certain operating functions of the technical installation is only released if up-to-date access authorization data is available.

The evaluation of the dynamic portion is done by comparing it with an expectation. In other words, a defined pattern must match an expected pattern. For example, within the pattern, a counter must be within a certain range starting from a previous value. Furthermore, based on a readout interval and a separate FS cycle time, certain expectation values can be defined, which define an expectation of the dynamic portion. Comparison may identify values that are too low, too high and/or equidistant over time. It is also possible to check whether session keys change over time. It is understood that the dynamic portion is not limited to the above examples, but may include other continuously changing information.

Depending on how the dynamic portion is formed, different verification options can be combined so that a probability of error can be reduced to a defined level. A probability of error may be reduced to a level that allows the system to be certified according to a high safety category without the receiving device itself having to be a fail-safe device.

If the dynamic portion remains unchanged for a defined period or if the dynamic portion does not correspond to the defined expectations, access to the technical installation or individual operating functions of the technical installation can be blocked and, if necessary, a safety function can be executed to transfer the machine into a safe state. However, the latter is only an ultima-ratio. Advantageously, the technical installation continues to run and only certain operating functions are blocked or restricted so that the availability of the technical installation is not unnecessarily restricted by the access control.

In an example embodiment, the access control device 28 can also forward the release signal determined from the dynamic access authorization data 48 to a fail-safe control unit 20, which carries out the actual blocking or release of operating functions and, if necessary, can execute a safety function that reduces a risk emanating from the machine to an acceptable level. It is also conceivable that the fail-safe control unit 20 carries out a pattern verification process in whole or in part instead of the access control unit 28.

The fail-safe control unit 20 can then control the technical installation 12 in a manner known per se and is characterized by the presence of redundant processing units 50a, 50b and safe outputs 52. The redundant processing units 50a, 50b can monitor each other and act independently on the safe outputs 52.

In an example embodiment, the access control device 28 can be a unit integrated into the fail-safe control unit 20. However, the access control unit 28 can also be implemented as separate units or as a module for a fail-safe control unit 20, which allows access control to be implemented independently of the safety control. For example, a technical installation monitored by a fail-safe control unit 20 can easily be supplemented with an access control system without having to change or exchange the hardware of the technical installation or adapt the fail-safe control unit 20. An access control system in accordance with the present disclosure can thus be retrofitted and supplemented easily even on existing systems.

Figure 2A:
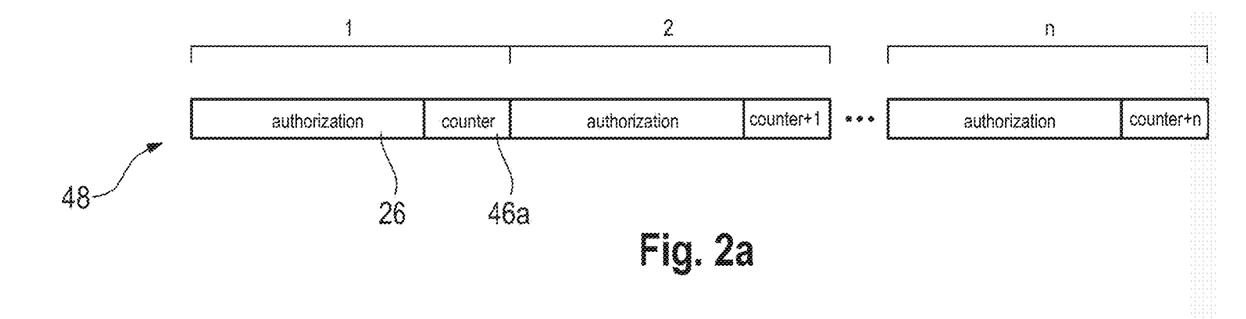
FIG. 2a is an example illustration of dynamic access authorization data with an incremental counter.
Figure 2B:
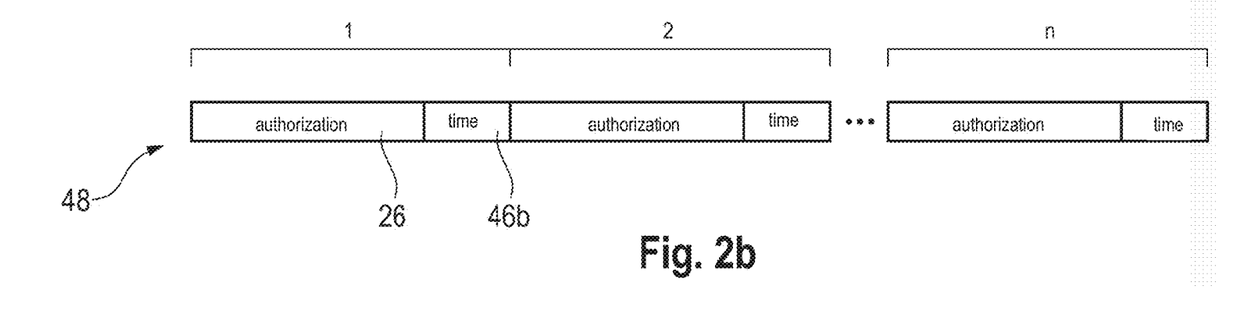
FIG. 2b is an example illustration of dynamic access authorization data with a time stamp.

FIGS. 2a and 2b show two examples of how a dynamic portion can be configured. It goes without saying that further variants, as described above, are conceivable in order to make the transmitted information dynamic.

FIG. 2a shows a data stream in which the dynamic portion comprises an incremental counter 46a. Every time access authorization data 26 is read, a counter is incremented by one digit and the current value of the counter is appended to the access authorization data 26. A packet that transmits the access authorization data 26 may thus be extended by an additional counter field in which the current value of the counter is stored. Thereby, each data packet is different from the previous one, even if the access authorization data has remained unchanged in a cycle.

In FIG. 2b a time stamp 46b is added to the access data 26 as dynamic portion instead of a counter. Particularly, the time stamp 46b can mark a point in time at which the associated access authorization data 26 has been completely read from the mobile data medium 24. Thereby, the access authorization data can be made dynamic.

Appending a dynamic portion 46 is only one way of making the information transmitted dynamic. Alternatively, the access authorization data 26 can also be linked to the dynamic portion in another way, for example by coding which links the access authorization data 26 to a dynamic element. Thus, in an example embodiment, a key ID may be combined with a counter.

Cyclic encryption is also conceivable, which generates different encrypted data from the same data in each cycle. However, the simple appending of the dynamic information has the advantage that the signal processing can be simple when generating and separating the dynamic access authorization data.

The use of counters and time stamps as values for the dynamic portion, as shown in FIGS. 2a and 2b, is only example. A large amount of dynamic and non-dynamic data may be linked and combined to create a complex pattern that depends on as many parameters as possible, which are unequal or based on different dynamic behavior, such as different change cycles. The more complex the pattern is, the higher is an achievable confidence level.

Figure 3:
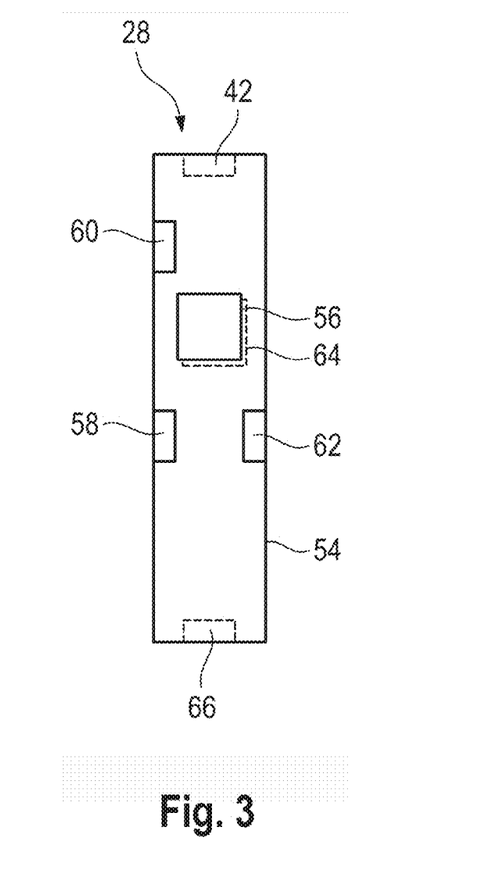
FIG. 3 is a simplified schematic representation of an example embodiment of an access control device.

FIG. 3 shows a simplified schematic diagram of an access control device 28, which is designed as an independent module and is arranged in its own housing 54. The access control device 28 can be retrofitted easily even in existing systems according to this embodiment.

In this embodiment, the access control device 28 has a processing unit 56 and several interfaces 42, 58, 60, 62.

The processing unit 56 can receive access authorization data via the first interface 58, which is validated by the processing unit 56. Via the second interface 60, the access control device 28 can control a selector connected to it based on the validated access authorization data. Controlling can include activating the selector so that it only grants a user access for those operating functions of a technical installation for which the access authorization data is valid.

Processing unit 56 may include a determination unit that extracts 26 the authorizations from the access authorization data if these are encoded in the access authorization data. Alternatively or in addition, the access authorization data may also contain referencing information, such as a user ID, which the determination unit 40 can use to determine the associated authorization. The access control device 28 may have an additional interface 42 for this purpose, via which the determination unit is connected to a data storage. The determination unit can be integrated into the processing unit 56 or the determination unit can be executed as a software module by the processing unit 56.

The access authorization data, which the access control unit 28 receives via the first interface 58, as described above, is further enriched by a dynamic portion 46, which can be extracted by the processing unit 56, evaluated and correlated with a defined expectation. Based on the dynamic portion 46 of the access authorization data 26, the access control device 28 can thus make a probability assessment whether the access authorization data 26 has been properly read by the receiving device and is currently still up-to-date, without the receiving device itself having any safety related equipment.

The access control device 28, on the other hand, can advantageously be configured as a safety device and for this purpose have an additional processing unit 64 in parallel with the processing unit 56. The processing units 56, 64 working in parallel may be configured to monitor each other to ensure fail-safe operation of the access control device 28.

In a further example embodiment, the access authorization device 28 can also be configured via additional safety outputs 66 in such a way that it itself performs fail-safe control of the technical installation. This has the advantage that the access control can be implemented independently of an existing safety technology. It is advantageous, however, that the access authorization device 28 is configured to interact with an already existing fail-safe control unit 20 and, if necessary, to delegate the evaluation of the dynamic data completely or partially to this fail-safe control unit 20. Thereby, the access authorization device 28 can be reduced to a minimum of required components, so that it can be implemented easily and cost-effectively.

Figure 4:
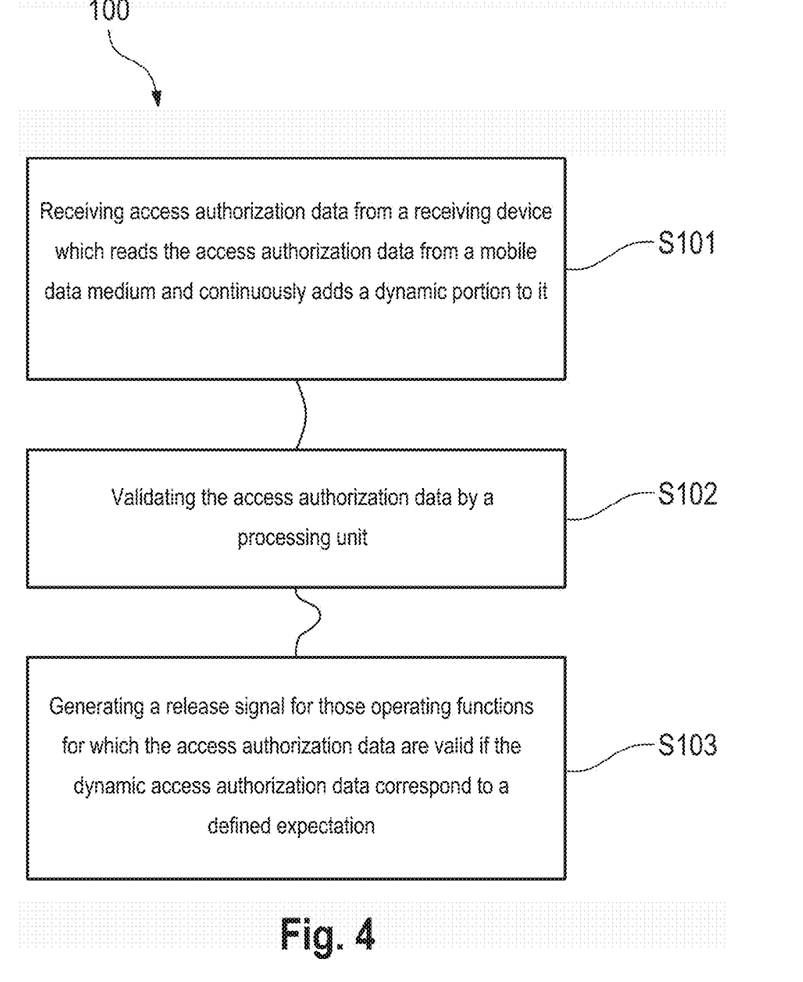
FIG. 4 is a flow diagram of an example embodiment of an access control method for controlling a user's access to one or more operating functions of a technical installation.

Finally, FIG. 4 illustrates in a flowchart an example embodiment of an access control method for controlling access of a user to one or more operating functions of a technical installation.

A first step S101 comprises receiving access authorization data from a receiving device which reads the access authorization data from a mobile data medium and continuously adds a dynamic portion to it.

A second step S102 comprises the validation of the access authorization data by a processing unit. The processing unit takes information from the access authorization data about which operating function is to be authorized. In an example embodiment, the information can come directly from the access authorization data or be determined via an external unit.

A third step S103 comprises generating a release signal for those operating functions for which the access authorization data is valid, if the dynamic access authorization data corresponds to a defined expectation. The release signal is therefore linked to whether the dynamic portions transmitted with the access authorization data correspond to a defined expectation. As described above, the dynamic portion are selected in such a way that a probability assessment can be made whether the access authorization data has been properly read and transferred.

A complex pattern can be used to determine the probability that the access authorization data has been read and transmitted correctly, so that overall the requirements for a high security category are met, even if the receiving device itself is not a safety device.

It is understood that the method, as exemplified here, can include further steps and is not limited to the sequence shown here. Further method steps may result from the configuration of the access control system as outlined above.

Furthermore, the scope of protection of the present invention is determined by the following claims and the scope of protection is not limited by the features explained in the description or shown in the figures.

The term computer-readable medium does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The phrase at least one of A, B, and C should be construed to mean a logical (A OR B OR C), using a non-exclusive logical OR, and should not be construed to mean "at least one of A, at least one of B, and at least one of C."

What is claimed is:

1. An access control system for controlling access of a user to one or more operating functions of a technical installation, the access control system comprising:
a receiving device; and
an access control device, wherein:
the receiving device is configured to (i) read access authorization data from a mobile data medium continuously, (ii) generate a dynamic portion continuously, (iii) add the dynamic portion to the access authorization data to create dynamic access authorization data, and (iv) send the dynamic access authorization data to the access control device, and
the access control device is configured to (i) receive the dynamic access authorization data from the receiving device and (ii) in response to the dynamic portion of the dynamic access authorization data corresponding to a defined expectation, generate an enable signal for those operating functions of the technical installation for which the access authorization data is valid.

2. The access control system according to claim 1, wherein the receiving device is configured to add a defined pattern as the dynamic portion of the access authorization data each time the access authorization data is read from the mobile data medium.

3. The access control system according to claim 2, wherein the pattern comprises at least one of an authorization, a serial number, a counter, a current session key, one or more previous session keys, a key ID, an absolute time value, and a relative time value.

4. The access control system according to claim 3, wherein the pattern is defined as a combination of at least two of an authorization, a serial number, a counter, a current session key, one or more previous session keys, a key ID, an absolute time value, and a relative time value.

5. The access control system according to claim 1, wherein the receiving device is configured to generate the dynamic portion only in response to at least one of (i) the access authorization data having been read out completely and (ii) the access authorization data being valid.

6. The access control system according to claim 1, wherein the receiving device is configured to transmit the dynamic access authorization data to the access control device in a one-channel manner.

7. The access control system according to claim 1, wherein the receiving device comprises a reading device for reading the mobile data medium via a wireless interface.

8. The access control system according to claim 1, further comprising:
a selector for selection by the user of one or more operating functions,
wherein the access control device is further arranged to configure the selector to grant the user access only to the authorized operating functions.

9. The access control system according to claim 8, wherein the access control device is configured to:

block the selector in response to the dynamic portion not having changed for a defined period and
block the selector in response to the dynamic portion not meeting the defined expectation.

10. The access control system according to claim 1, further comprising:
a fail-safe control unit that is configured to ensure fail-safe operation of the technical installation and to execute a safety function,
wherein the access control device is configured to transmit the enable signal to the fail-safe control unit so that the fail-safe control unit controls the technical installation based on the enable signal.

11. The access control system according to claim 10, wherein the fail-safe control unit transfers the technical installation into a secure state in response to no release signal having been sent.

12. The access control system according to claim 10, wherein the access control device is one of an integral part, a component, and a module of the fail-safe control unit.

13. The access control system according to claim 1, wherein the technical installation is located in an industrial environment.

14. An access control device for controlling access by a user to one or more operating functions of a technical installation, the access control device comprising:
an interface configured to receive dynamic access authorization data from a receiving device, which reads access authorization data from a mobile data medium continuously, continuously generates a dynamic portion, and continuously adds the dynamic portion to the access authorization data to obtain the dynamic access authorization data; and
a processing unit configured to validate the access authorization data,
wherein the access control device is configured to, in response to the dynamic portion of the dynamic access authorization data corresponding to a defined expectation, generate an enable signal for those operating functions of the technical installation for which the access authorization data is valid.

15. The access control device according to claim 14, wherein the technical installation is located in an industrial environment.

16. An access control method for controlling access of a user to one or more operating functions of a technical installation, the access control method comprising:
reading, at a receiving device, access authorization data from a mobile data medium continuously;
at the receiving device, continuously generating a dynamic portion;
at the receiving device, adding the dynamic portion to the access authorization data to obtain dynamic access authorization data;
sending the dynamic access authorization data from the receiving device to an access control device;
at the access control device, receiving, the dynamic access authorization data; and
in response to the dynamic portion of the dynamic access authorization data corresponding to a defined expectation, generating, at the access control device, an enable signal for those operating functions of the technical installation for which the access authorization data is valid.

17. A non-transitory computer-readable medium comprising instructions that, when executed by a computer, cause the computer to perform the method of claim 16.

18. The access control method according to claim 16, wherein the technical installation is located in an industrial environment.

\* \* \* \* \*